US010726734B2

United States Patent
Helt et al.

(10) Patent No.: US 10,726,734 B2
(45) Date of Patent: Jul. 28, 2020

(54) FILM FOR EMERGENCY RESPONDER SMOKE SIMULATION TRAINING

(71) Applicant: TBRT Engineering, LLC, Lake Mills, WI (US)

(72) Inventors: Jon M. Helt, Lake Mills, WI (US); Michael J. Helt, Lake Mills, WI (US)

(*) Notice: Subject to any disclaimer, the term of this patent is extended or adjusted under 35 U.S.C. 154(b) by 232 days.

(21) Appl. No.: 15/686,851

(22) Filed: Aug. 25, 2017

(65) Prior Publication Data

US 2018/0061265 A1 Mar. 1, 2018

Related U.S. Application Data

(60) Provisional application No. 62/379,460, filed on Aug. 25, 2016.

(51) Int. Cl.
G09B 19/00 (2006.01)
G09B 9/00 (2006.01)
B41M 3/00 (2006.01)

(52) U.S. Cl.
CPC ............... *G09B 9/00* (2013.01); *B41M 3/00* (2013.01); *G09B 19/00* (2013.01)

(58) Field of Classification Search
USPC ............ 434/226; 2/10, 15, 434; 351/45, 47, 351/159.57, 159.58, 159.63, 159.8, 351/159.81
See application file for complete search history.

(56) References Cited

U.S. PATENT DOCUMENTS

| | | | | |
|---|---|---|---|---|
| 3,287,828 A * | 11/1966 | Cumming | ............. | G09B 9/326 434/36 |
| 3,436,840 A * | 4/1969 | Noxon | ................. | G09B 9/326 434/36 |
| 4,482,326 A * | 11/1984 | Witt | ..................... | G09B 9/165 434/36 |
| 4,564,274 A * | 1/1986 | Clark | ..................... | A61B 3/02 351/222 |
| 4,716,601 A * | 1/1988 | McNeal | ................. | A61F 9/025 2/434 |
| 5,362,238 A * | 11/1994 | Slavin | ..................... | G09B 9/05 351/47 |
| 5,660,549 A * | 8/1997 | Witt, III | ............. | A62C 99/0081 434/21 |
| 5,671,483 A * | 9/1997 | Reuber | .................. | A42B 3/245 2/424 |
| 5,867,247 A * | 2/1999 | Martin | ..................... | A61F 9/00 351/159.81 |
| 6,003,990 A * | 12/1999 | Einhorn | ................. | G02C 7/086 351/45 |
| 6,206,521 B1 * | 3/2001 | Kindschuh | ............. | G02B 3/08 351/159.58 |
| 6,687,910 B1 * | 2/2004 | Smallwood | ........ | A62C 99/0081 2/10 |
| 6,942,336 B2 * | 9/2005 | Foulke | ................... | G02C 5/001 351/45 |
| 7,232,219 B2 * | 6/2007 | Aguilar | ................... | G02C 7/16 351/159.58 |

(Continued)

*Primary Examiner* — Kurt Fernstrom
(74) *Attorney, Agent, or Firm* — Casimir Jones SC; David W. Staple

(57) ABSTRACT

Provided herein are vision impairing devices for simulated hazardous conditions training comprising a thin film with printed pattern and tint.

12 Claims, 7 Drawing Sheets

(56) References Cited

U.S. PATENT DOCUMENTS

| | | | |
|---|---|---|---|
| 8,075,131 B2* | 12/2011 | Kusmec-Aguilar | G02C 7/16 351/45 |
| 8,411,214 B2* | 4/2013 | Chapman | G09B 9/30 349/13 |
| 10,209,532 B2* | 2/2019 | Parker | G02C 7/02 |
| 10,255,676 B2* | 4/2019 | Gupta | G06T 7/0012 |

* cited by examiner

CAMlock

DRAGER FPS-7000

Universal

MSA g1

MSA - ULTRA ELITE
FIREHAWK

SCOTT AV-3000

FIG. 2

Visual Clarity
Indirect Light

| Clarity | Distance | Condition & Testing |
|---|---|---|
| 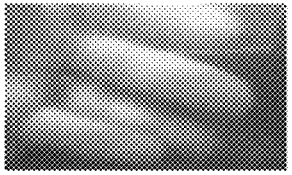 | 0in | Clearly see a hand with wedding ring on finger. |
| 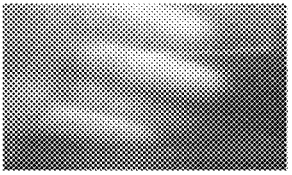 | 2in | See a hand but it is not clear there is a ring on finger. |
| 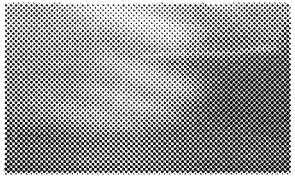 | 4in | See hand but can no longer see ring on finger |
| 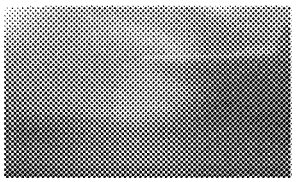 | 6in | Can see outline of hand and what appears to be fingers. |
| 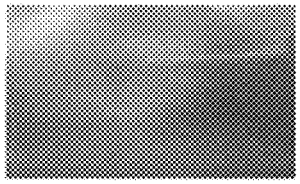 | 8in | Can see outline of what appears to be a hand. |
| 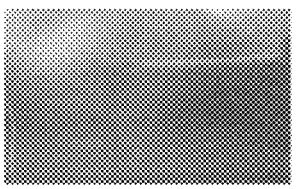 | 10in | Faintly see hand but cannot tell it is a hand. |
| 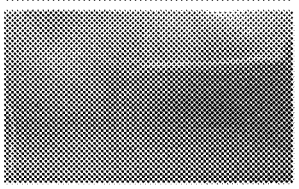 | 12in | Cannot see any physical object. |

FIG. 3

SMOKE DENSITY
Indirect Light

| Density | Example | Condition (Tested at 5 feet) |
|---|---|---|
| 0% | | Clear visibility. |
| 15 | | Hazey but still able to recongnize physical objects. |
| 25 | | Objects all appear grey but can still be recognized. |
| 35 | | Only some objects can be recognized. |
| 45 | | Everything is dark and grey, nothing physical is visible. |

FILM FOR EMERGENCY RESPONDER SMOKE SIMULATION TRAINING

FIELD

Provided herein are vision impairing devices for simulated hazardous conditions training comprising a thin film with printed pattern and tint.

BACKGROUND

Emergency responders often train for real life situations involving hazardous scenarios. These scenarios are intended to simulate the presence of smoke and lack of light thus altering their vision. During these training situations it is desirable to have a method for altering the trainee's vision. If the vision is not altered it may not truly reflect the real life conditions. Existing devices and methods of vision have limitations, including inaccurate or insufficient simulation of the true distortion of vision that smoke causes, and impracticality of use. What is needed is a vision altering device to simulate the true effects of a smoke filled atmosphere without altering the feel, function or form of the shield or mask for the trainee.

SUMMARY

In some embodiments, provided herein are vision impairing devices for simulated hazardous conditions training comprising of a thin film with printed pattern and tint. In some embodiments, the pattern comprises multiple amorphous shapes (e.g., 2, 3, 4, 5, 6, 7, 8, 9, 10, 12, 14, 16, 18, 20, 25, 30, 35, 40, 45, 50, 60, 60, 80, 90, 100, or more, or ranges therebetween) that alter light and create a distortion effect at a distance. In some embodiments, the tinting creates a darkening effect e.g., opacity of 10%, 20%, 30%, 40%, 50%, 60%, 70%, 80%, 90%, or ranges therebetween). In some embodiments, the device comprises a non-permanent adhesive on one side for application to an eye protecting shield or mask (e.g., glue, epoxy, water transfer, static cling, or heat transfer). In some embodiments, the non-permanent adhesive leaves little or no residue and can be reapplied multiple times. In some embodiments, the film is suitable for application multiple times to various surfaces.

BRIEF DESCRIPTION OF THE DRAWINGS

FIG. 2 shows the distortion of sight at increasing distances of an exemplary film.

FIG. 3 shows the sight distortion caused varying gradients of darkening tint.

DETAILED DESCRIPTION

Figure 1A:
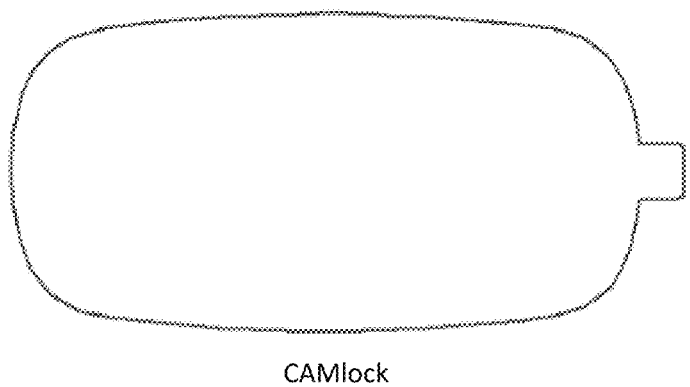
FIG. 1A-F show the outlines of an exemplary films.

Provided herein are vision impairing devices for simulated hazardous conditions training comprising a thin film with printed pattern and tint.

In some embodiments, the present invention comprises a printed sight altering film. Suitable films can be of varying thicknesses, but in some embodiments a film has a thickness of about 1 mil (e.g., 0.5 mil, 1.0 mil, 1.5 mil, 2 mil, 3 mil, 4 mil, 5 mil, 6 mil, 10 mil, or ranges therebetween). A film may comprise any suitable material, but in some embodiments a film comprises a plastic or polymer, such as, but not limited to vinyl, Mylar, bi-oriented polypropylene, vellum, HDPE, PVC, PET, PLA, foil, etc.

In some embodiments, the device comprises amorphous objects, designs, patterns, and, or lines printed on the film or applied to the film. In some embodiments, the device comprises objects (e.g., squares, rectangles, triangles, trapezoids, parallelograms, pentagons, hexagons, n-gons, circles, ovals, etc.) printed on the film or applied to the film. In some embodiments, the printed pattering is a series of obscure shapes and/or lines. In some embodiments, they are varying gradients of grayscale and may be of varying color. In some embodiments, grayscale shades between 0 (black) and 100 (white) are used (e.g., 0, 5, 10, 15, 20, 25, 30, 35, 40, 45, 50, 55, 60, 65, 70, 75, 80, 85, 90, 95, 100, or any ranges therebetween (e.g., 30-70, 55-80, etc.), In some embodiments, various colors comprising tints of yellow, brown, etc. are included. In some embodiments, the size of the shapes varies from one to another. In some embodiments, the objects have dimensions (e.g., lengths, widths, diameters, etc.) on the order of less than 2 mm (e.g., 1.5 mm, 1 mm, 0.8 mm, 0.6 mm, 0.4 mm, 0.2 mm, 0.1 mm, 0.08 mm, 0.06 mm, 0.04 mm, 0.02 mm, 0.01 mm, or less, or ranges therebetween). In some embodiments, the lines vary in thickness from one to another. In some embodiments, the thickness of the line is no greater than the thickness of a human hair (e.g., 0.01 mm, 0.02 mm, 0.04 mm, 0.06 mm, 0.08 mm, 0.10 mm, 0.12 mm, 0.14 mm, 0.16 mm, 0.18 mm, 0.20 mm, and ranges therebetween). In some embodiments, the shapes are semi-transparent and some are not. In some embodiments, the levels of transparency are most often less than 50% (e.g., 10%, 20%, 30%, 40%, or 50%, or range therebetween).

In some embodiments, the film has a darkening tint that simulates the darkening effect of smoke. In some embodiments, the percent opacity ranges from clear to black out (e.g., opacity of 10%, 20%, 30%, 40%, 50%, 60%, 70%, 80%, 90%, or ranges therebetween).

In some embodiments, the film has a non-permanent adhesive on one side for attachment and/or reuse. In some embodiments, the adhesive is more often a light glue but could be many other substrates (e.g., glue, epoxy, water transfer, static cling, or heat transfer).

In some embodiments, a finger sized tab is located on the outer edge for easy removal. The finger tab could be located in many orientations around the perimeter of the mask, but in preferred embodiments is located in the upper corner for a clean removal of the film from one side to the other.

Figure 1B:
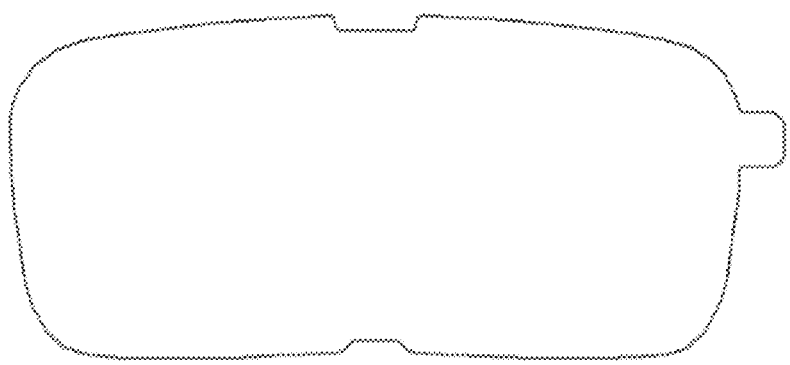
Figure 1C:
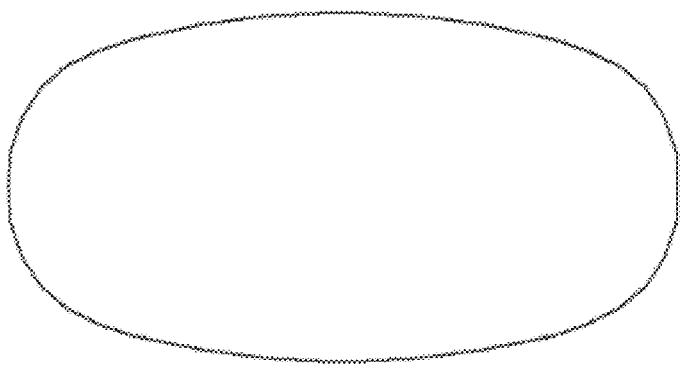
Figure 1D:
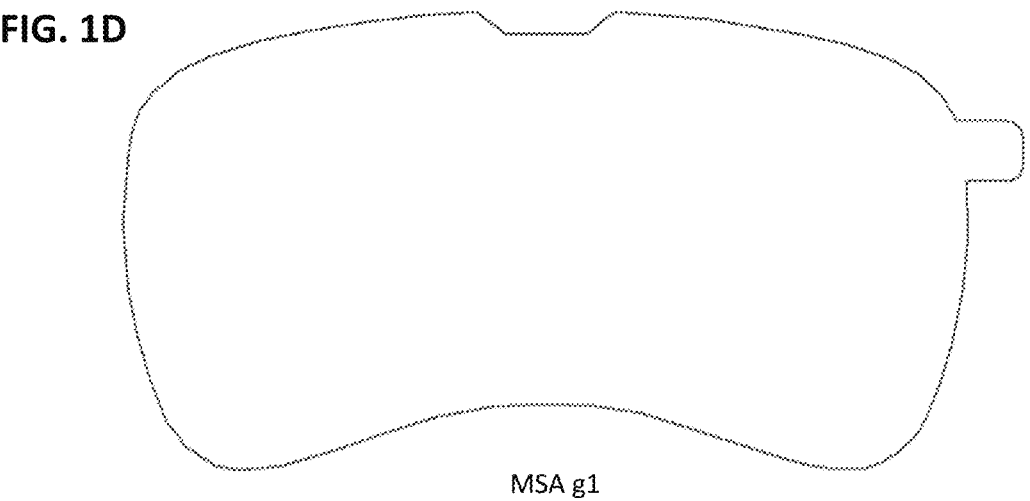
Figure 1E:
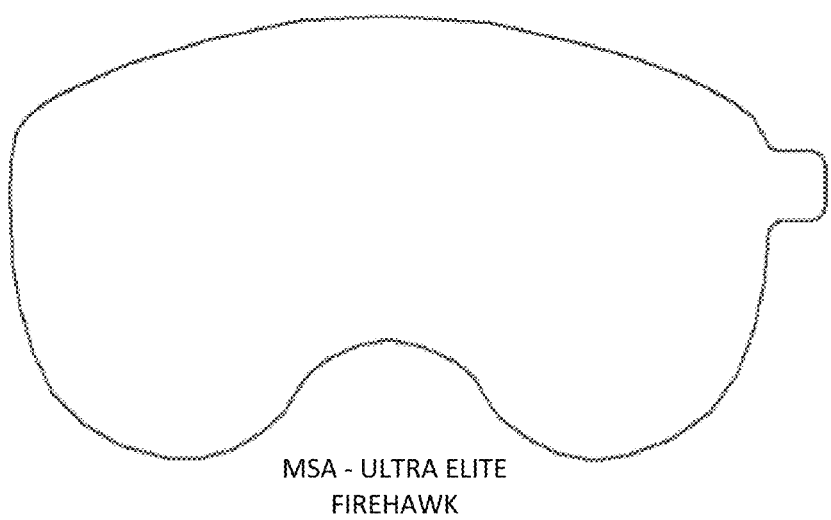
Figure 1F:
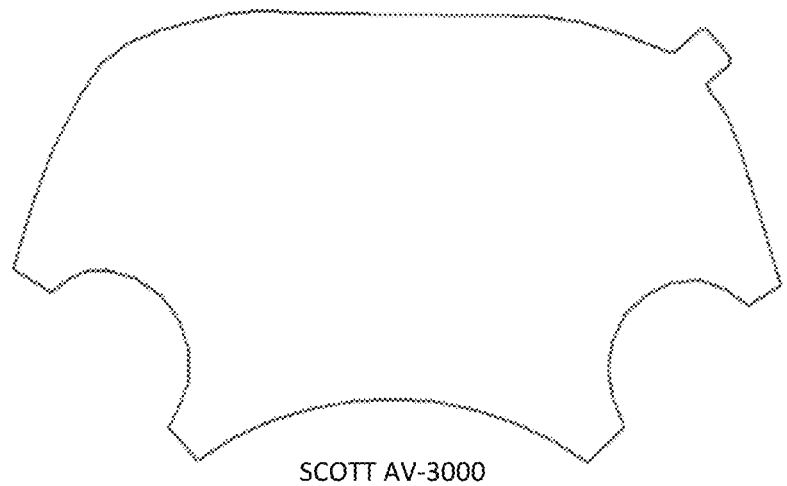
Figure 4:
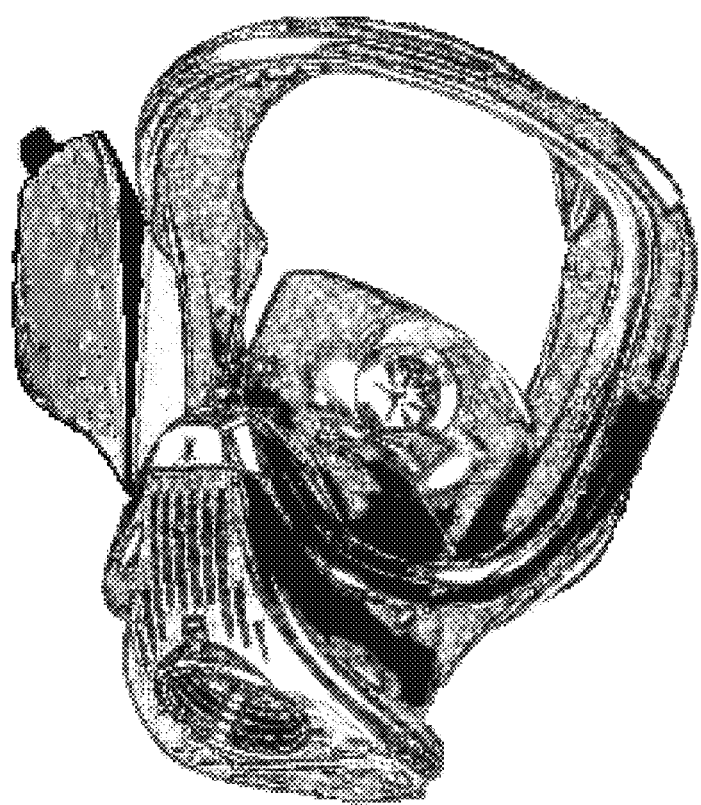
FIG. 4 shows an exemplary film being applied to an SCBA mask.
Figure 5:
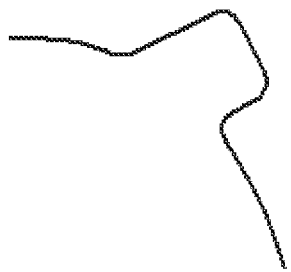
FIG. 5 shows the removal tab on an exemplary film for clean removal and reuse.
Figure 6:
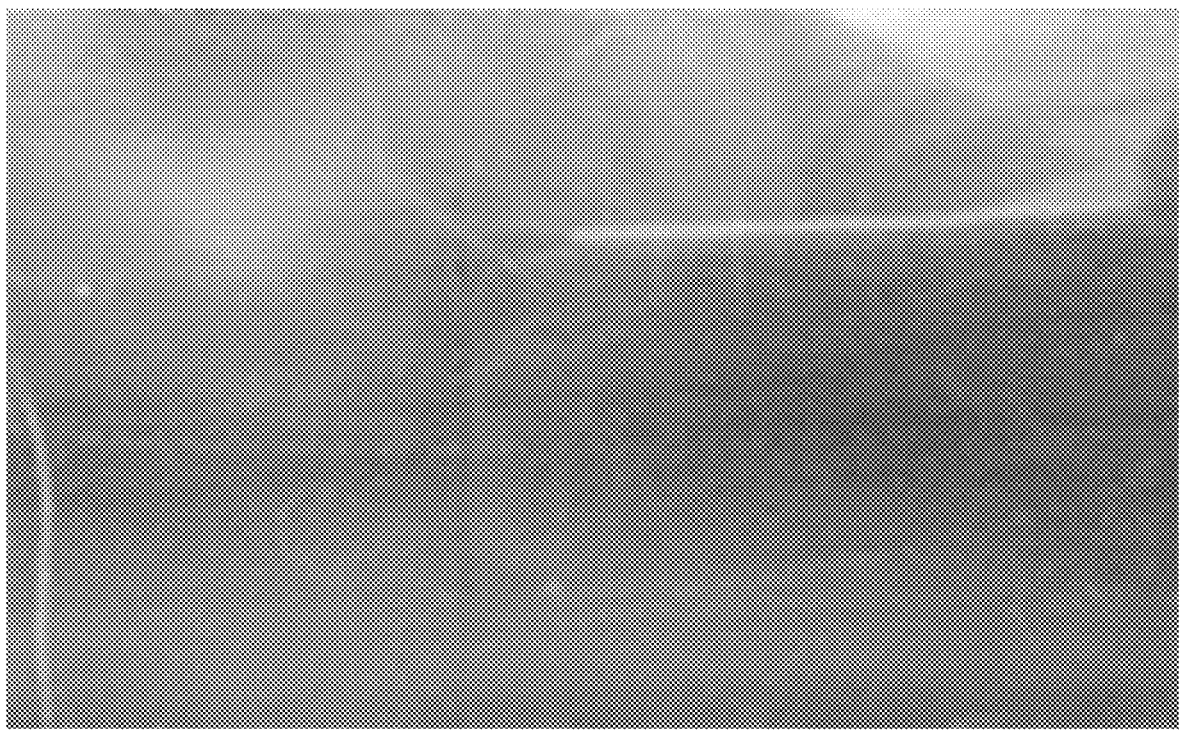
FIG. 6 shows an exemplary grain structure used to create the sight distortion.

If an subject (e.g., emergency responder) would like to simulate the effects of a smoke filled room but not have to train in a hazardous environment, they apply the film to their mask or shield. They match the die cut size with the vision opening of the mask or shield. In some embodiments, films are provided to match the size and shape of commercially-available masks and/or shields (FIG. 1). In some embodiments, films are of any suitable size/shape. In some embodiments, films are prepared in custom size/shapes. In some embodiments, a subject (e.g., emergency responder) conducts their training while wearing the film on their mask/shield. Once their training is complete, they can remove the film from the shield or mask by use of the finger tab, thus not having to remove the mask or shield from their face. The film can then by placed back on the paper backing that the film comes on, or other storage location, or future reuse.

In some embodiments, a device herein comprises three main components, the film (1), the printed pattern (3)(6), and the adhesive backing (5).

In some embodiments, the film (1) comprises a flexible piece of material. In some embodiments, the film is stretchable. In some embodiments, the film is not stretchable. In some embodiments, the film is of any suitable size, but generally is round in shape and cut to match the net shape of a SEBA mask (4) or other face shield, typically measuring about 8 inches in width, about 3 inches in height and less than about 1/32" in thickness; although other widths (e.g., 2 inches, 3 inches, 4 inches, 5 inches, 6 inches, 7 inches, 8 inches, 9 inches, 10 inches, 11 inches, 12 inches, 13 inches, 14 inches, 15 inches, 16 inches, or ranges therebetween) heights (e.g., 0.5 inches, 1 inch, 1.5 inches, 2 inches, 2.5 inches, 3 inches, 3.5 inches, 4 inches, 4.5 inches, 5 inches, 5.5 inches, 6 inches, 7 inches, 8 inches, 9 inches, or ranges therebetween), and thicknesses (e.g., 0.01 inches, 0.02 inches, 0.03 inches, 0.04 inches, 0.05 inches, 0.06 inches, 0.07 inches, 0.08 inches, and ranges therebetween) are within the scope herein. In some embodiments, a finger tab (5) is located on one edge and is present for use when removing the film.

In some embodiments, the printed pattern (3)(6) comprises an obscure and/or amorphous shape layout and connecting lines. When light is passed through it, the obscure and/or amorphous shapes create a distortion affect that is magnified at further sight distances (2). In some embodiments, darkening tint is added to the printing to simulate darkening of light similar to the effects of sight in a smoked filled environment.

In some embodiments, adhesive backing is present on one side of the film and used to temporarily secure the film to a mask or shield. In some embodiments, the adhesive backing is a non-permanent solution that allows for a secure but temporary fit to anything. The securing properties hold up for a repeated use after removal. In some embodiments, a finger tab (5) is used too unsecure the film from a mask or shield.

In some embodiments, the film is secured to a mask or shield by removing the film (1) from its backing or container (e.g., paper backing), that provides an effective way for storing the film between uses. Once the film is removed, the user lines up the net shape with the sight opening on the mask or shield and applies one edge to the mask or shield (4). In some embodiments, the film is then firmly pressed from the initial edged along the face of the mask or shield to the opposing edge. Any air bubbles and kinks are to be pushed out with the users thumb and fingers. If alignment is off, the film can easily be removed with the use of the finger tab (5) and reapplied in the same fashion as outlined above, Once the film is in place, the user can train with it until it is no longer needed. The user can then remove the film by use of the finger tab (5) while still donning the mask or shield. The user can also remove the mask or shield and then remove the film by use of the finger tab (5). The mask can then be re applied the paper backing and stored for future use.

It should be noted that this invention is not limited to only training for smoke simulated environments, and can be useful in other sight-altered training situations (e.g., darkness, underwater, etc.).

The invention claimed is:

1. A device for simulating the effects of a smoke filled atmosphere, comprising:
   a) a thin film approximating the size and shape of a vision shield or mask;
   b) a series of amorphous shapes on the thin film capable of altering light and creating distortion;
   c) a grayscale shade on the thin film to darken the distorted sight.

2. The device as in claim 1, further comprising one or more lines on the film.

3. The device as in claim 2, wherein the lines are less than 0.2 mm thick.

4. The device as in claim 1, wherein the amorphous shapes are partially opaque.

5. The device as in claim 4, wherein the amorphous shapes are less than 50% transparent.

6. The device as in claim 1, wherein the grayscale shade simulates a smoke density of 15-45%.

7. The device as in claim 1, further comprising of an adhesive on one side allowing for temporary bond to a shield or mask.

8. A method of quickly applying a distortion to an eyewear shield or mask for simulated hazardous environment training, comprising applying a device of claim 1 to the eyewear shield or mask.

9. The method of claim 8, comprising:
   a) removing the film from a backing and applying to a shield or mask with human hand pressure until the shield or mask is entirely covered;
   b) donning the shield or mask;
   c) perform the simulated training; and
   d) when training is completed, removing the film and reapplying the film to the backing.

10. The device of claim 1, wherein the series of amorphous shapes are printed on the thin film.

11. The device of claim 1, wherein the grayscale shade is printed on the thin film.

12. The device of claim 2, wherein the one or more lines are printed on the thin film.

* * * * *